United States Patent
Bosch et al.

(10) Patent No.: US 8,488,553 B2
(45) Date of Patent: Jul. 16, 2013

(54) METHOD FOR PROVIDING SEAMLESS TRANSITION BETWEEN NETWORKS FOLLOWING DIFFERENT PROTOCOLS

(75) Inventors: Peter Bosch, Aalsmeer (NL); Frank R. Favichia, Sparta, NJ (US)

(73) Assignee: Alcatel Lucent, Paris (FR)

( * ) Notice: Subject to any disclaimer, the term of this patent is extended or adjusted under 35 U.S.C. 154(b) by 792 days.

(21) Appl. No.: 12/155,501

(22) Filed: Jun. 5, 2008

(65) Prior Publication Data

US 2009/0303963 A1 Dec. 10, 2009

(51) Int. Cl.
*H04W 4/00* (2009.01)

(52) U.S. Cl.
USPC .......................................................... 370/331

(58) Field of Classification Search
USPC .......................................................... 370/331
See application file for complete search history.

(56) References Cited

U.S. PATENT DOCUMENTS

| | | | | |
|---|---|---|---|---|
| 6,556,587 | B1 * | 4/2003 | Svanbro et al. | 370/471 |
| 7,817,635 | B2 * | 10/2010 | Akhtar et al. | 370/392 |
| 2002/0018010 | A1 * | 2/2002 | Le | 341/60 |
| 2002/0196743 | A1 * | 12/2002 | Thalanany et al. | 370/252 |
| 2004/0042507 | A1 | 3/2004 | Pelletier et al. | |
| 2005/0185677 | A1 * | 8/2005 | Christoffersson et al. | 370/521 |
| 2005/0286469 | A1 * | 12/2005 | Yang et al. | 370/331 |
| 2006/0009150 | A1 * | 1/2006 | Leung et al. | 455/3.01 |
| 2006/0072512 | A1 * | 4/2006 | Das et al. | 370/335 |
| 2006/0256813 | A1 * | 11/2006 | Brusca et al. | 370/466 |
| 2007/0047547 | A1 * | 3/2007 | Conner et al. | 370/392 |
| 2007/0165574 | A1 * | 7/2007 | Srey et al. | 370/331 |
| 2007/0218903 | A1 * | 9/2007 | Grech | 455/436 |
| 2007/0258418 | A1 * | 11/2007 | Wurtenberger et al. | 370/338 |
| 2008/0037548 | A1 | 2/2008 | Yi et al. | |
| 2008/0259876 | A1 * | 10/2008 | Qiang et al. | 370/332 |
| 2009/0086676 | A1 * | 4/2009 | Meylan et al. | 370/331 |
| 2009/0109924 | A1 * | 4/2009 | Sato | 370/331 |
| 2009/0154460 | A1 * | 6/2009 | Varela et al. | 370/392 |
| 2009/0175163 | A1 * | 7/2009 | Sammour et al. | 370/216 |

(Continued)

FOREIGN PATENT DOCUMENTS

| | | |
|---|---|---|
| JP | 2007-336490 | 12/2007 |
| KR | 10-2007-0096392 | 10/2007 |

OTHER PUBLICATIONS

Ericsson,Nortel,Verizon Wireless, Cisco, Solutions to minimize packet losses for handover between E-UTRAN and HRPD, Oct. 8-12, 2007, 3GPP TSG SA WG2 Architecture—S2#60, pp. 1-10.*

(Continued)

*Primary Examiner* — Brandon Renner
*Assistant Examiner* — Faisal Choudhury
(74) *Attorney, Agent, or Firm* — Harness, Dickey & Pierce PLC

(57) ABSTRACT

Example embodiments provide methods for handling the transition of a mobile device from a first network to a second network, the second network operating according to a different communications protocol from the first network. One example embodiment includes terminating forwarding of the data packets from the first network to the mobile device; rebuilding headers of unforwarded data packets at the first network; and sending the rebuilt data packets from the first network to the second network. Another example embodiment includes resetting a header compression state at the second network; receiving unforwarded data packets from the first network at the second network, the unforwarded data packets being data packets the first network had not yet forwarded to the mobile device; and sending the unforwarded data packets from the second network to the mobile device.

12 Claims, 3 Drawing Sheets

U.S. PATENT DOCUMENTS

| | | | | |
|---|---|---|---|---|
| 2009/0176513 | A1* | 7/2009 | Bosch et al. | 455/458 |
| 2009/0232093 | A1* | 9/2009 | Lecompte | 370/331 |
| 2010/0002650 | A1* | 1/2010 | Ahluwalia | 370/331 |
| 2010/0023830 | A1* | 1/2010 | Wengerter et al. | 714/748 |
| 2010/0067483 | A1* | 3/2010 | Ahluwalia | 370/331 |

OTHER PUBLICATIONS

Ericsson, Nortel, Verizon Wireless, Cisco, Solutions to minimize packet losses for handover between E-UTRAN and HRPD, Oct. 8-12, 2007, 3GPP TSG SA WG2 Architecture—S2#60, S2-074114, pp. 1-10.*

Ericsson et al. "Solutions to minimize packet losses for handover between E-UTRAN and HRPD," 3GPP Draft; S2-074114 Minimize_Packet_Losses_Rev5, 3rd Generation Partnership Project (3GPP), Mobile Competence Centre; 650, Route des Lucioles, F-06921 Sophia-Antipolis Cedex; France, vol. SA WG2, No. Kobe, 20071002, Oct. 2, 2007, XP050260956, retreived Oct. 2, 2007.

"Discussion in PDCP Context Transfer," 3GPP TSG RAN WG2 #57, vol. R2-070617, No. 57, Feb. 12, 2007, pp. 1-6, XP002509442, Retreived from Internet: URL:http://wwww.3gpp/org/ftp/tsg_ran/WG2_RL2/TSGR2_57/Documents/R2-070617.zip, retreived Oct. 9, 2007.

International Search Report and Written Opinion dated Dec. 22, 2009.

International Preliminary Report on Patentability and Written Opinion for International patent application No. PCT/US2009/003078 dated Dec. 16, 2010.

Office Action for Korean Application No. 10-2010-7027082 dated Sep. 27, 2011.

3GPP TR23.882 V1.15.0, 3GPP, Feb. 2008, p. 49.

Office Action for corresponding Japanese Application No. 2011-512449 dated Oct. 31, 2011 and English translation.

* cited by examiner

METHOD FOR PROVIDING SEAMLESS TRANSITION BETWEEN NETWORKS FOLLOWING DIFFERENT PROTOCOLS

BACKGROUND OF THE INVENTION

1. Field

Example embodiments of the present invention relate generally to wireless networks and transitioning between wireless networks of different protocols.

2. Description of the Related Art

CDMA2000 EVDO and 3GPP LTE are two different protocols that may be used in wireless networks to support the transmission of IP data packets to and from mobile devices connected to the wireless networks. An operator that deploys a CDMA2000 network and would like to configure the CDMA2000 network to facilitate the transition of a mobile device communicating with the CDMA2000 network to the LTE network and back will be presented with a number of interoperability problems.

Due to differences in data transmission speeds between the wired internet and wireless networks, when a target mobile device is active on a CDMA2000 network, IP packets received at the CDMA2000 network for the target mobile device are buffered until the target mobile device is prepared to receive them. If the target mobile device transitions from the CDMA2000 network to the LTE network before the buffered data packets are forwarded to the target mobile device, the buffered and unforwarded data packets will be lost.

Similarly, when a target mobile device is active on an LTE network, IP packets received at the LTE network for the target mobile device are buffered until the target mobile device is prepared to receive them. If the target mobile device transitions from the LTE network to the CDMA2000 network before the buffered data packets are forwarded to the target mobile device, the buffered and unforwarded data packets will be lost.

A target mobile device receiving data packets on a CDMA2000 or LTE network may be engaged in a TCP session with one or more other devices. The TCP protocol uses congestion control algorithms to inhibit congestion on a network by limiting the rate at which data is sent once congestion is detected. If the target mobile device is engaged in a TCP session with another device when the target mobile transitions from a CDMA2000 network to an LTE network or an LTE network to a CDMA2000 network, the loss of one or more packets may be interpreted by TCP algorithms as an indicator of network congestion. Accordingly, the loss of the buffered and unforwarded data packets may trigger a significant reduction in the speed with which data packets are sent to the target mobile device resulting in substantial delays.

SUMMARY OF THE INVENTION

The present invention relates to a method of handling a transition of a mobile device from a first network to a second network, the first and second networks following different communications protocols.

In one embodiment, forwarding of the data packets from the first network to the mobile device is terminated. Packet headers of unforwarded data packets at the first network are rebuilt and the rebuilt packets are sent from the first network to the second network.

In another embodiment, the header compression state at the second network is reset. The second network receives unforwarded data packets from the first network, where the unforwarded data packets are data packets the first network had not yet forwarded to the mobile device. The unforwarded data packets are sent by the second network to the mobile device.

The example embodiments may minimize data packet loss for a transitioning mobile device and/or may reduce the sending duplicate data packets.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
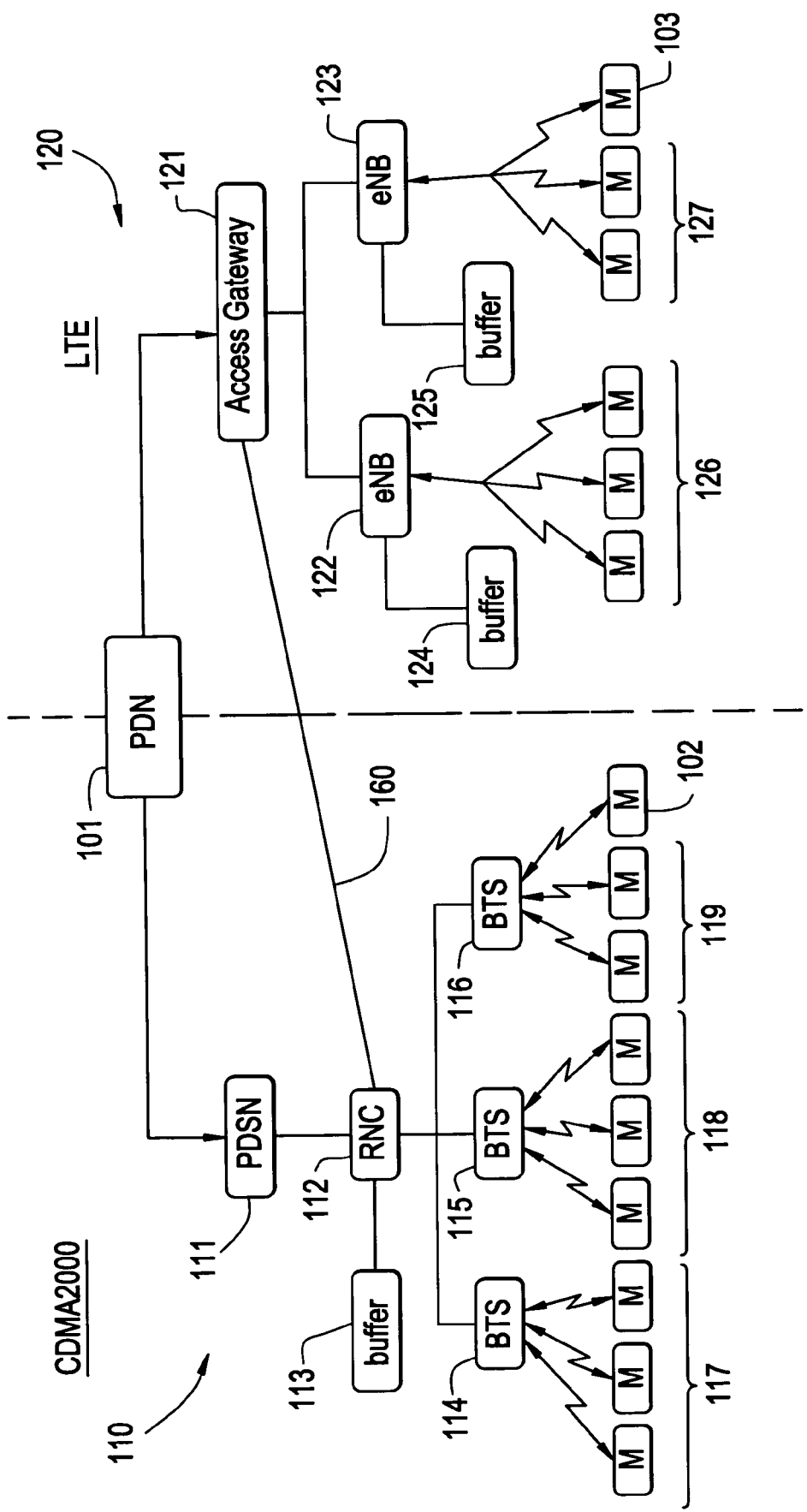
FIG. 1 is a diagram illustrating a CDMA2000 network and an LTE network.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "mobile" may be considered synonymous to, and may hereafter be occasionally referred to, as a mobile unit, mobile station, mobile user, user equipment (UE), subscriber, user, remote station, access terminal, receiver, etc., and may describe a remote user of wireless resources in a wireless communication network. The term "base station" may be considered synonymous to and/or referred to as a base transceiver station (BTS), NodeB, extended Node B, femto cell, access point, etc. and may describe equipment that provides the radio baseband functions for data and/or voice connectivity between a network and one or more users.

Architecture

FIG. 1 illustrates a network following the CDMA2000 protocol 110 and a network following the LTE protocol 120 according to example embodiments.

Referring to FIG. 1, a CDMA2000 network 110 includes a packet data serving node (PDSN) 111, a radio network controller (RNC) 112, a plurality of base stations or base transceiver stations (BTS) 114~116 and a plurality of mobile devices 117~119, 102. The CDMA2000 network 110 may have multiple RNCs and PDSNs, however, only one of each is shown for clarity. The PDSN 111 is connected to a public data network (PDN) 101 through a proxy mobile IP interface. The RNC 112 is connected to the PDSN 111, the BTSs 114~116 are connected to the RNC 112 and the mobile devices 117~119, 102 are each in wireless communication with a BTS 114~116. The RNC 112 includes a buffer 113. PDSN 111 may also be referred to as a HRPD SGW or HSGW (high rate packet data service gateway). Though network 110 is illustrated as a CDMA2000 network, network 110 is not limited to the CDMA2000 protocol.

Referring again to FIG. 1, an LTE network 120 includes an Access Gateway 121, a plurality of base stations or enhanced-node Bs (eNBs) 122~123, and a plurality of mobile devices 126~127, 103. The Access Gateway 121 is connected to the PDN 101 through a GTP and/or mobile IP protocol. The LTE network 120 may include multiple Access Gateways however, only one is shown for clarity. The eNBs 122~123 are connected to the Access Gateway 121. The plurality of mobile devices 126~127, 103 are in wireless communication with eNBs 122~123. The Access Gateway 121 may include a Management Mobility Endpoint (MME) and a Serving Gateway (SGVV) which are omitted from FIG. 1 for clarity. The eNBs include buffers 124~125.

As FIG. 1 illustrates, RNC 112 and the Access Gateway 121 are directly connected to one another through an interface 160.

CDMA2000 Network Operation

In a typical operation of a CDMA2000 network having the configuration illustrated in FIG. 1, the PDN 101 receives a data packet addressed to, for example, a target mobile device 102. The target mobile device 102 is one of the plurality of mobile devices 117~119, 102 in communication with the CDMA2000 network 110. The PDN 101 sends the data packet to the PDSN 111. The PDSN 111 forwards the data packet to the RNC 112. The RNC 112 may store the data receive the data packet, the RNC 112 forwards the data packet to the BTIS associated with target mobile device 102, BTIS 116. The data packet may be an Internet Protocol (IP) packet and may have a header.

The CDMA2000 network 110 may implement header compression such as Robust Header Compression (RoHC) or any other well-know header compression. Using header compression, the CDMA2000 network 110 may greatly reduce the size of headers of the data packets being sent from the PDSN 111 to a mobile device by sending only a portion of the packet headers. In order to use header compression for packets being sent from the PDSN 111 to a target mobile device 102 in CDMA2000 network 110, the PDSN 111 establishes a compression dictionary and target mobile device 102 establishes a decompression dictionary. The compression and decompression dictionaries store the static portions of the headers of the data packets being sent and received. It may take one or more of full packets being sent from the PDSN 111 to target mobile device 110 to establish the compression and decompression dictionaries.

Once the compression and decompression dictionaries are established, the PDSN 111 uses the compression dictionary to compress packet headers (i.e., remove static portions of the packet headers) and sends data packets with the compressed headers to the target mobile device 102. The target mobile device 102 uses the decompression dictionary to decompress the compressed headers of the data packets (i.e., reinsert the static portions of the packet headers) for processing at the mobile device.

The PDSN 111 may instruct the target mobile device 102 to reset its decompression dictionary. For example, when the target mobile device 102 and the PDSN 111 have established decompression and compression dictionaries, respectively, the PDSN 111 may send a data packet with an uncompressed header to the target mobile device 102. The target mobile device 102 may interpret the uncompressed data packet as an indication to reset its decompression dictionary.

LTE Network Operation

In a typical operation of the LTE network having the configuration illustrated in FIG. 1, the PDN 101 receives a data packet addressed to, for example, a target mobile device 103. The target mobile device 103 is one of the plurality of mobile devices in communication with the LTE network 120. The PDN 101 sends the data packet to the Access Gateway 121. The Access Gateway 121 sends the data packet to the eNB associated with the target mobile device, eNB 123. The eNB 123 forwards the data packet to the target mobile device 103. Header compression for the LTE operation is performed in the eNB.

Handling a Transition from CDMA2000 to LTE

A method for handling the transition of a mobile from a first network to a second network will be explained with reference to the target mobile 102 transitioning from the CDMA2000 network 110 to the LTE network 120, in FIG. 1.

However, it will be understood that this embodiment is not limited in application to the mobile 102 or the architecture of FIG. 1.

Referring to FIG. 1, the target mobile device 102, which has been communicating with BTS 116 on CDMA2000 network 110, transitions to LTE network 120 and begins communicating with eNB 122. Those of ordinary skill in the art will recognize that the transition of the mobile 102 from the CDMA2000 network 110 to the LTE network 120 may be initiated according to any known technique including signaling between the mobile and at least one of the CDMA2000 network 110 and the LTE network 120.

Figure 2:
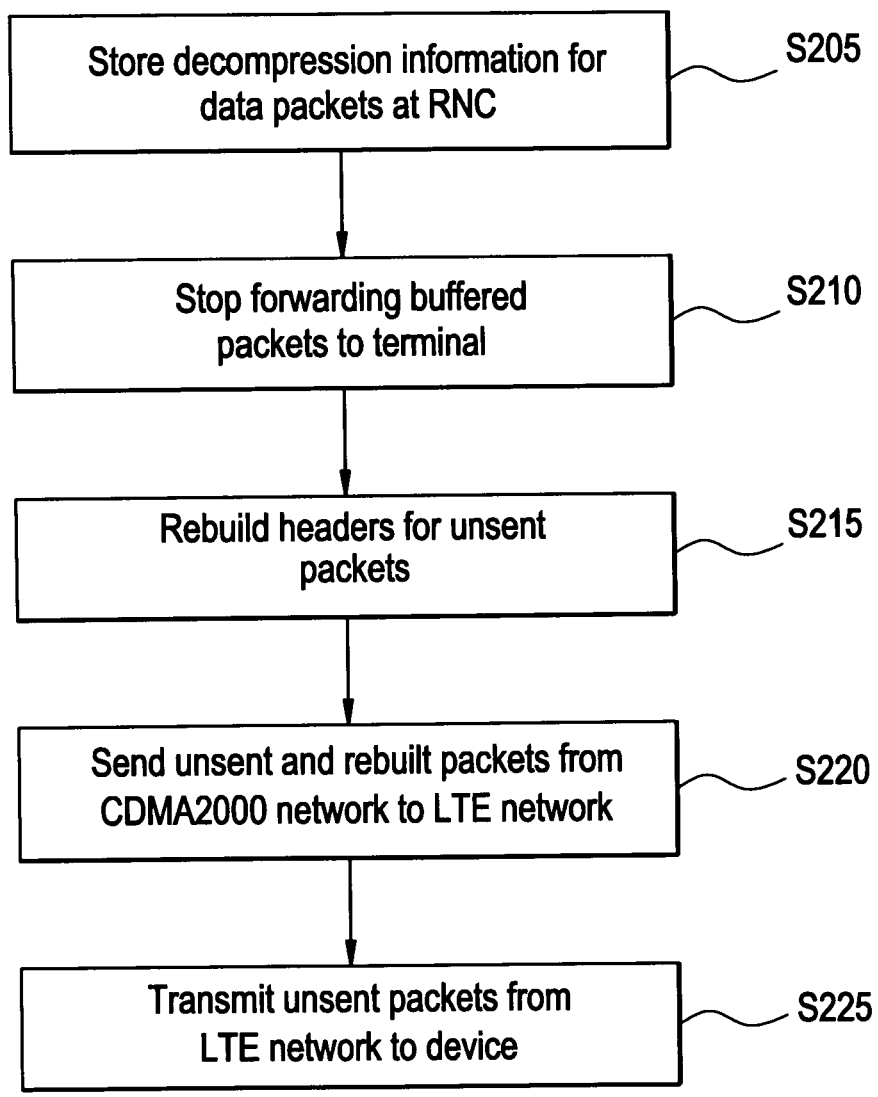
FIG. 2 is a flow chart illustrating a method for handling the transition of a mobile device from a CDMA2000 network to an LTE network.

FIG. 2 is a flow chart illustrating a method of handling a transition from a network following the CDMA2000 protocol to a network following the LTE protocol according to example embodiments.

In step S205, in addition to the compression and decompression dictionaries typically stored at, for example, the PDSN 111 and the mobile device 102, decompression information (e.g., decompression dictionary) for received data packets is also is stored at the RNC 112 in the CDMA2000 network. Namely, the RNC 112 is configured to store decompression information relating to data packets that are sent from the PDSN 111 to mobile devices.

Referring to FIG. 1, each data packet that was sent from the PDSN 111 to the target mobile device 102 first passed through the RNC 112. The RNC 112 is configured to use data packets that were sent from PDSN 111 to the target mobile device 102 to, for example, compile a decompression dictionary in the same manner as the target mobile device 102.

Once the mobile device 102 transitions from the CDMA2000 network 110 to the LTE network 120, the RNC 112 is capable of using the decompression information collected from the data packets that were sent from the PDSN 111 to the transitioning mobile device 102 to rebuild the packet headers of the unforwarded data packets that are stored in the buffer 113 at the RNC 112 and addressed to the transitioning mobile device 102.

Figure 3:
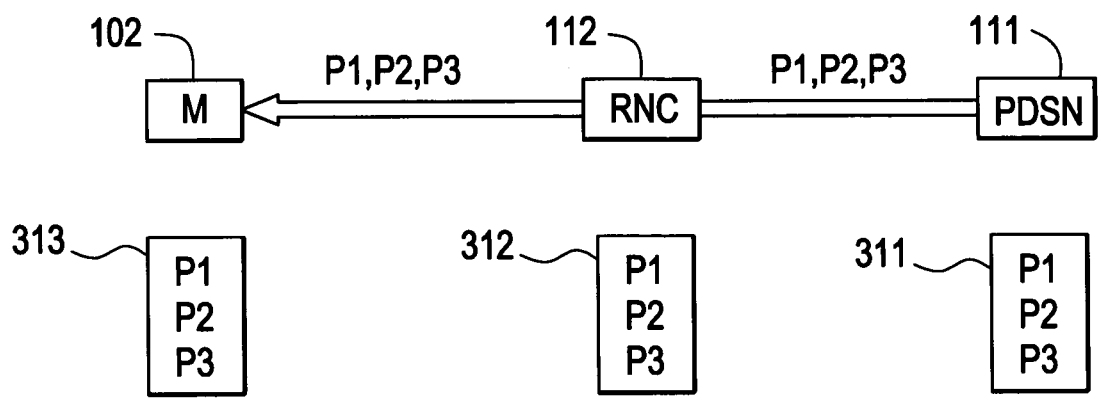
FIG. 3 is a diagram illustrating an example of rebuilding data packet headers at an RNC.

FIG. 3 is a diagram illustrating an example of building a decompression dictionary at an RNC. Referring to FIG. 3, the PDSN 111 sends data packets P1, P2 and P3 to target mobile device 102. The PDSN 111 establishes a compression dictionary 311 based on data packets P1, P2 and P3. The target mobile 102 establishes a decompression dictionary 313 based on data packets P1, P2 and P3. The RNC 112 receives each packet sent from the PDSN 111 to the target mobile 102. The RNC 112 establishes decompression dictionary 312, which may be identical to decompression dictionary 313. The RNC 112 now has the capability to decompress data packets sent by the PDSN 111 to the target mobile 102.

Returning to FIG. 2, in step S210, the forwarding of buffered packets to the mobile device 102 is terminated as a result of the mobile device 102 transitioning to the LTE network 120. Once the target mobile 102 begins wireless communications with eNB 122, wireless communications with BTS 116 cease. Buffered packets can no longer be forwarded through BTS 116 to the target mobile 102 because the wireless channel between BTS 116 and target mobile 102 no longer exists.

In step S215, the headers of unsent buffered packets are rebuilt by the RNC 112. Data packets buffered at the CDMA2000 network 110 that have not yet been forwarded to target mobile device 102 are stored in buffer 113 of the RNC 112. These data packets may have compressed headers. Buffered, unforwarded data packets addressed to target mobile device 102 are decompressed by the RNC 112 in the same manner that the mobile device 102 performs decompression. Namely, the buffered, unforwarded data packets are decompressed at the RNC 112 using the decompression information stored in the RNC 112 in step S205.

Decompressing the data packet headers prior to sending the data packets to the LTE network may be necessary because the CDMA2000 network 110 uses packet header compression and the LTE network will not have the necessary decompression information to decompress the compressed data packets headers. Accordingly, if unforwarded packets are sent from the CDMA2000 network 110 to the LTE network 120 without decompressing compressed packet headers, the LTE network will not be able to interpret the compressed headers of the unforwarded packets. Consequently, the LTE network 120 will not be able to deliver the packets to transitioning mobile device 102 and the data packets will be lost.

Referring to FIG. 2, in step S220 the unsent and rebuilt data packets are sent from the RNC 112 directly to the Access Gateway 121 of LTE network 120 via the interface 160. Because the packet headers of the unforwarded data packets are rebuilt, the rebuilt data packets are sent as full IP packets directly to LTE network 120, and LTE network 120 may process the data packets as LTE network 120 would process a data packet received from PDN 101.

Referring to FIG. 2, in step S225, the LTE network 120 sends the data packets received via the interface 160 to the mobile device 102. Referring to FIG. 1, Access Gateway 121 sends the data packets to the eNB 122 which then sends the data packets to the target mobile 102.

Handling a Transition from LTE to CDMA2000

A method for handling the transition of a mobile device from a first network to a second network will be explained with reference to the target mobile 103 transitioning from the LTE network 120 to the CDMA2000 network 110.

Figure 4:
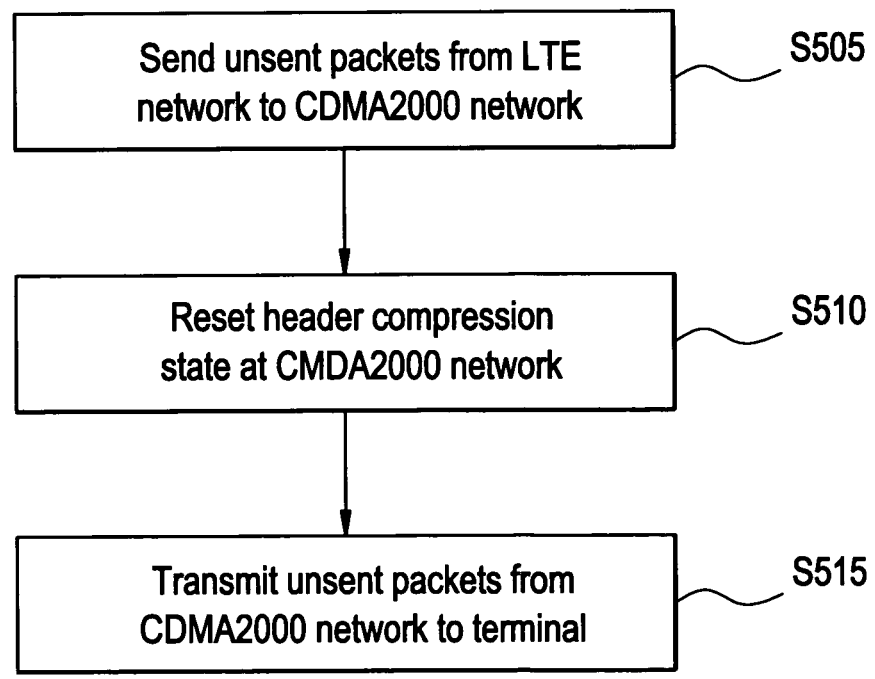
FIG. 4 is a flow chart illustrating a method for handling the transition of a mobile device from an LTE network to a CDMA2000 network.

FIG. 4 is a flow chart illustrating a method of handling a transition of a mobile device from a network following the LTE protocol to a network following the CDMA2000 protocol according to example embodiments. This embodiment will be described referring to FIG. 1, for the target mobile device 103, which has been communicating with the eNB 123 in the LTE network 120, transitioning to the BTS 116 of the CDMA2000 network 110. However, it will be understood that this embodiment is not limited in application to the mobile 103 or the architecture of FIG. 1.

Further, those of ordinary skill in the art will recognize that the transition of the mobile 103 from the LTE network 120 to the CDMA2000 network 110 may be initiated according to any known technique including signaling between the mobile and at least one of the CDMA2000 network 110 and the LTE network 120.

Referring to FIG. 4, in step S505 packets that have not yet been sent to the mobile device 103 by the LTE network 120 are sent to the CDMA2000 network 110. Data packets stored at the LTE network 120 that have not yet been forwarded to the transitioning target mobile device 103 are stored in buffer 125 of eNB 123. After target mobile device 103 transitions from the LTE network 120 to the CDMA2000 network 110, the eNB 123 sends the unforwarded data packets to the Access Gateway 121. The Access Gateway 121 sends the unforwarded data packets directly to the RNC 112 at the CDMA2000 110 network through the interface 160 between the RNC 112 and the Access Gateway 121.

Referring to FIG. 4, in step S510 the header compression state at the CDMA2000 network 110 is reset. When unforwarded data packets arrive from LTE network 120, the PDSN 111 and the target mobile device 103 may have already established compression and decompression dictionaries, respectively. For example, transitioning target mobile device 103 may have begun receiving packets from CDMA2000 network 110 immediately upon entering the CDMA2000 network 110. The PDSN 111 and target mobile device 103 may have established compression and decompression dictionaries based on these data packets. Additionally, the target mobile device 103 may have been connected to CDMA2000 network 110 previously. Accordingly, the PDSN 111 and the target mobile device 103 may have established compression and decompression dictionaries during a previous connection of the target mobile device 103 to CDMA2000 network 110.

When unforwarded data packets received from the LTE network 120 at the RNC 112 are forwarded to the mobile device 103, the mobile device 103 updates its decompression dictionary based on the unforwarded data packets the mobile device 103 receives. However, PDSN 111 does not see the unforwarded data packets that are sent from the RNC 112 to the target mobile device 103. Accordingly, the compression dictionary at PDSN 111 may become out of synch with the decompression dictionary at the target mobile device 103.

If the compression dictionary at the PDSN 111 and the decompression dictionary at the target mobile 103 remain out of synch, data packets sent subsequently from the PDSN 111 to the target mobile device 103 will be compressed based on the out-of synch dictionary. The target mobile device 103 will not be able to use the updated compression dictionary to properly decompress these subsequently sent data packets. Error checking procedures carried out at target mobile 103 device may interpret the improperly decompressed data packets as corrupt data packets and discard them. Accordingly, data packets will be lost. To avoid losing data packets, according to example embodiments, when mobile device 103 transitions to the CDMA2000 network 110 from the LTE network 120, the RNC 112 sends a point-to-point protocol (PPP) message to the PDSN 111 instructing the PDSN 111 to reset its header state.

While the PPP message instructing the PDSN 111 to reset a header compression state is described as being sent by the RNC 112 to the PDSN 111 after the RNC 112 receives unforwarded packets from the LTE network 120, the RNC 112 may send the compression state reset message to the PDSN 111 before sending an unforwarded packet to mobile device 103. The RNC 112 may also send the compression state reset message to the PDSN 111 simultaneously with sending an unforwarded packet to the target mobile device 103. The RNC 112 may send a compression state reset message as soon as the target mobile device 103 enters the CDMA2000 network 110. The RNC 112 may also send a compression state reset message to the PDSN 111 once the target mobile device 103 leaves the CDMA2000 network 110 in anticipation of the target mobile device 103 returning to the CDMA2000 network 110.

Referring to FIG. 4, in step S515 unsent packets are sent from the CDMA2000 network 110 to the mobile device 103. Referring to FIG. 1, the RNC 112 forwards the unforwarded data packets to the BTS 116 which then sends the unforwarded data packets to target mobile device 103. The unforwarded data packets are full, uncompressed IP packets.

Methods for handling the transition of a mobile device from a first network to a second network according to example embodiments allows a mobile device to transition back and forth between a CDMA2000 network an LTE network while minimizing the loss of data packets that are buffered at the original network and have not yet been sent to the mobile device at the point of transition. The transition is also accomplished without requiring duplicate data packets to be sent to both the CDMA2000 and LTE networks.

The invention being thus described, it will be obvious that the same may be varied in many ways. Such variations are not to be regarded as a departure from the invention, and all such modifications are intended to be included within the scope of the invention.

What is claimed:

1. A method of handling a transition of a mobile device from a first network following a CDMA2000 protocol to a second network following an LTE protocol, the method comprising:
    building a decompression dictionary at a Radio Network Controller (RNC) in the first network using data packets previously forwarded to the mobile device;
    terminating forwarding of data packets from the first network to the mobile device;
    rebuilding headers of unforwarded data packets at the first network using the decompression dictionary stored at the first network to decompress compressed headers of the unforwarded data packets; and
    sending the rebuilt data packets from the RNC in the first network to the second network, the second network operating according to a different communication protocol from the first network.

2. The method of claim 1, further comprising:
    storing the unforwarded data packets in a buffer at the RNC in the first network.

3. The method of claim 1, wherein the rebuilding headers includes using information stored at the first network to decompress compressed headers of the unforwarded data packets.

4. The method of claim 2, wherein the rebuilding headers includes using information stored at the RNC to decompress compressed headers of the unforwarded data packets.

5. The method of claim 2, wherein sending the rebuilt data packets from the first network to the second network includes sending data packets from the RNC to the second network.

6. The method of claim 1, wherein the sending of the rebuilt data packets is via a channel between the RNC and an Access Gateway in the second network.

7. A method of handling a transition of a mobile device from a first network following a LTE protocol to a second network following a CDMA2000 protocol, the method comprising:
    receiving unforwarded data packets having uncompressed headers from the first network at the second network, the second network operating according to a different communications protocol from the first network, the unforwarded data packets being data packets the first network had not yet forwarded to the mobile device;
    resetting a header compression state at the second network to clear any compression dictionary previously established at the second network for the mobile device and resynchronize the compression dictionary at the second network with a decompression dictionary at the mobile device, if the the second network receives the unforwarded data packets having the uncompressed headers; and
    sending the unforwarded data packets from the second network to the mobile device.

8. The method of claim 7, wherein the receiving unforwarded data packets at the second network includes receiving data packets at a controller in the second network.

9. The method of claim 8, wherein the resetting of the header compression state at the second network is performed by sending a PPP (point-to-point protocol) message.

10. The method of claim 9, wherein the resetting is performed by sending the PPP message from the controller.

11. The method of claim 7, wherein the receiving unforwarded data packets at the second network includes receiving the unforwarded data packets at a Radio Network Controller (RNC) in the second network.

12. The method of claim 11, wherein the receiving of the unforwarded data packets at the RNC is via a channel between the RNC and an Access Gateway in the first network.

* * * * *